(12) United States Patent  
Smith et al.

(10) Patent No.: US 7,556,401 B2
(45) Date of Patent: Jul. 7, 2009

(54) ADJUSTABLE LASER MODULE

(75) Inventors: David M. Smith, Simpsonville, SC (US); Anthony M. Sorrells, Pickens, SC (US)

(73) Assignee: Eastway Fair Company Limited (VG)

( * ) Notice: Subject to any disclaimer, the term of this patent is extended or adjusted under 35 U.S.C. 154(b) by 335 days.

(21) Appl. No.: 11/595,326

(22) Filed: Nov. 8, 2006

(65) Prior Publication Data

US 2008/0105100 A1    May 8, 2008

(51) Int. Cl.
*B26D 7/00* (2006.01)

(52) U.S. Cl. .................. 362/259; 362/285; 362/253; 83/520; 83/522.15

(58) Field of Classification Search .............. 362/119, 362/259, 253, 285, 89; 83/520, 522.15, 522.11
See application file for complete search history.

(56) References Cited

U.S. PATENT DOCUMENTS

| | | | |
|---|---|---|---|
| 3,789,208 A | 1/1974 | Lewis | |
| 4,383,244 A | 5/1983 | Knauff | |
| 4,796,972 A | 1/1989 | Thomas et al. | |
| 5,285,708 A | 2/1994 | Bosten et al. | |
| 5,375,495 A | 12/1994 | Bosten et al. | |
| 5,446,635 A | 8/1995 | Jehn | |
| 5,653,523 A | 8/1997 | Roberts | |
| 5,675,899 A | 10/1997 | Webb | |
| 5,683,164 A | 11/1997 | Chien | |
| 5,730,520 A | 3/1998 | Hsu et al. | |
| 5,806,959 A | 9/1998 | Adams et al. | |
| 5,839,814 A | 11/1998 | Roberts | |
| 5,862,727 A | 1/1999 | Kelly | |
| 5,957,541 A | 9/1999 | Seigler | |
| 5,996,460 A | 12/1999 | Waite | |
| 6,035,757 A | 3/2000 | Caluori et al. | |
| 6,397,717 B1 | 6/2002 | Waite | |
| D460,469 S | 7/2002 | Yue et al. | |
| 6,481,322 B1 | 11/2002 | Hsiung | |
| 6,497,168 B1 | 12/2002 | Levine | |
| 6,584,695 B1 | 7/2003 | Chang | |
| 6,755,107 B2 | 6/2004 | Peot et al. | |
| D492,951 S | 7/2004 | Caluori | |
| 6,820,528 B1 | 11/2004 | Liu et al. | |
| 6,915,727 B2 | 7/2005 | Caluori | |
| 6,988,439 B2 | 1/2006 | Liu et al. | |
| 7,458,696 B2 * | 12/2008 | Chen ........................... | 362/89 |
| 2001/0049988 A1 | 12/2001 | Ushiwata et al. | |
| 2003/0010173 A1 | 1/2003 | Hayden | |
| 2003/0121160 A1 | 7/2003 | Chang | |
| 2003/0140758 A1 | 7/2003 | Weusthof et al. | |
| 2004/0083869 A1 | 5/2004 | Aziz et al. | |
| 2004/0159199 A1 | 8/2004 | Peot et al. | |
| 2004/0194600 A1 | 10/2004 | Wu et al. | |

(Continued)

*Primary Examiner*—Thomas M Sember
(74) *Attorney, Agent, or Firm*—Michael Best & Friedrich LLP

(57) ABSTRACT

A laser module for use with a rotating blade-type cutting device, such as a miter saw. The laser module includes a housing rotating in unison with the saw blade, a laser generator positioned within the housing so as to emit a laser beam therefrom, a flexure bracket having a connector portion connected to the housing and a support portion supporting the laser generator, and an adjuster extending through the housing and engaging the flexure bracket. The adjuster is movable with respect to the housing to adjust the direction of the laser beam between periods of operation of the cutting device.

17 Claims, 3 Drawing Sheets

U.S. PATENT DOCUMENTS

| | | |
|---|---|---|
| 2005/0000342 A1 | 1/2005 | Ushiwata et al. |
| 2005/0011325 A1 | 1/2005 | Caluori |
| 2005/0011326 A1 | 1/2005 | Ushiwata et al. |
| 2005/0011327 A1 | 1/2005 | Ushiwata et al. |
| 2005/0098011 A1 | 5/2005 | Kao et al. |
| 2005/0166737 A1 | 8/2005 | Caluori |
| 2005/0217445 A1 | 10/2005 | Peot et al. |
| 2005/0262983 A1 | 12/2005 | Hetcher et al. |
| 2005/0262984 A1 | 12/2005 | Hetcher et al. |
| 2008/0025014 A1* | 1/2008 | Chen .......................... 362/89 |

* cited by examiner

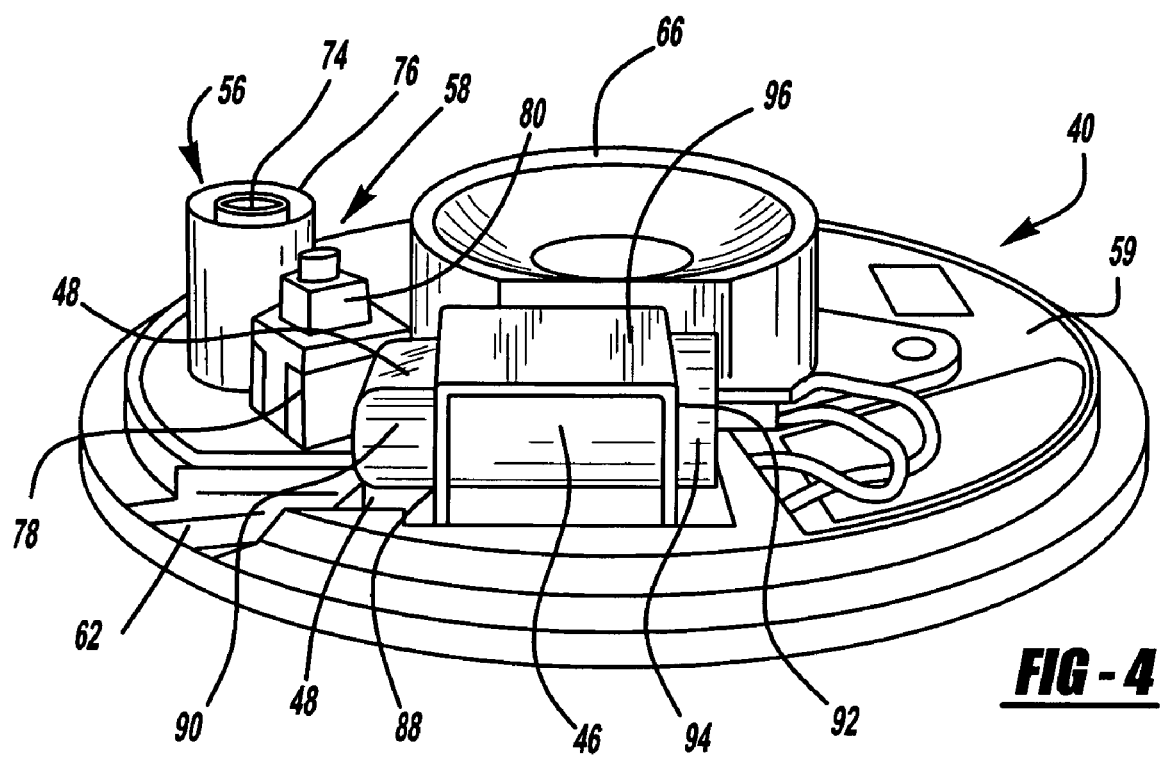

ADJUSTABLE LASER MODULE

The present invention relates to a laser module for a rotating blade-type saw, such as a miter saw. More specifically, the present invention relates to a laser module having an adjustable light beam path for use with a rotating blade-type saw.

BACKGROUND OF THE INVENTION

Rotating saws, such as miter saws, are typically used to cut wood and other materials at precise lengths and angles. Miter saws generally include a base for supporting a workpiece to be cut, an arm extending upwardly from the base, and a saw head assembly pivotally connected to the arm. The saw head assembly includes a rotating spindle, a power source for driving the spindle, and a blade supported by the spindle so as to rotate in unison therewith. During use, the operator activates the power source to rotate the blade and lowers the saw head assembly towards the base, thereby cutting the area of workpiece between the blade cutting edges (commonly known as the kerf). When the cut is intended for a specific location along the workpiece, the operator typically marks the workpiece and attempts to align the saw blade with the mark before making the cut. To improve the alignment of the blade with respect to the mark on the workpiece, currently known saws often include laser alignment devices that project a laser beam onto the top surface of the workpiece.

BRIEF SUMMARY OF THE INVENTION

The present invention includes a laser module for use with a rotating blade-type cuffing device, such as a miter saw circular saw and the like. The laser module includes a housing rotating in unison with the saw blade, a laser generator positioned within the housing so as to emit a laser beam therefrom, a flexure bracket having a connector portion connected to the housing, a support portion supporting the laser generator, and an adjuster extending through the housing and engaging the flexure bracket. The adjuster is movable with respect to the housing to adjust the direction of the laser beam between periods of operation of the cutting device.

In one aspect of the present invention, the adjuster is a screw extending through an opening in the housing. Additionally, the screw may be in threaded engagement with the housing so that rotation of the screw adjusts the beam path direction. The screw engages the support portion of the flexure bracket so that rotation of the screw moves the laser generator with respect to the housing and adjusts the beam path direction.

In another aspect, the support portion of the flexure bracket includes first and second arms respectively supporting first and second end portions of the laser generator so that the laser generator is securely positioned within the module housing. The first arm of the flexure bracket defines an opening for receiving the first end portion of the laser generator and the second arm of the flexure bracket defines another opening for receiving the second end portion of the laser generator. Additionally, the laser generator fits within the openings in a press-fit manner.

In yet another aspect of the present invention, the flexure bracket is a generally rectangular component formed of a material having some resilience such as sheet metal. Additionally, the flexure bracket may be a single, unitary component.

In another aspect, the flexure bracket includes a first arm extending away from the housing to support a first end portion of the laser generator, a second arm supporting a second end portion of the laser generator, and a third arm extending between the first and second arms. The second arm may be spaced apart from the housing to define a gap therebetween and the adjuster engages the third arm of the flexure bracket to adjust the size of the gap and the beam path direction

BRIEF DESCRIPTION OF THE DRAWINGS

FIG. 4 is a side perspective view of the inner cover of the laser module shown in FIG. 3; and FIG. 5 is a side perspective view of a flexure bracket shown in FIG. 4.

DETAILED DESCRIPTION OF THE INVENTION

Figure 1:
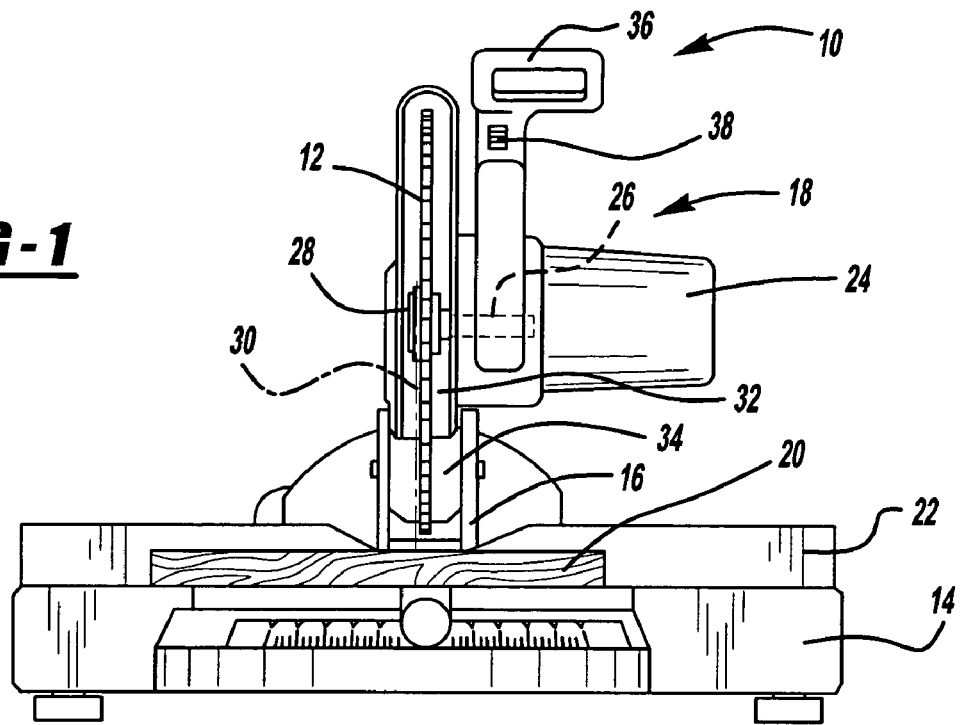
FIG. 1 is a partial cross-sectional view of a miter saw having a laser module embodying the principles of the present invention.

Referring now to the drawings and initially to FIG. 1, a rotating blade-type cutting device, such as a miter saw 10 is shown. The miter saw 10 generally includes a base 14, an arm 16 extending upwards from the base 14, and a saw head assembly 18 pivotally supported by the arm 16 and configured to rotate a saw blade 12 with respect to the base 14. The base 14 includes a flat surface for supporting a workpiece 20 and a fence 22 against which the workpiece 18 may be held in a desired position, such as perpendicular to the saw blade 12. The saw head assembly 18 includes a motor assembly 24, a shaft 26 rotated by the motor assembly 24, a laser module 28 for mounting the circular saw blade 12 to the shaft 26 and projecting an indicator beam 30 toward the workpiece 20, a fixed guard 32 and a movable shield 34 generally positioned around the saw blade 12 for shielding purposes, a handle 36 for moving the saw head assembly 18 with respect to the arm 16, and a power switch 38 for activating the motor assembly 24. The pivotable connection between the saw head assembly 18 and the arm 16 may include a spring (not shown) for biasing the saw head assembly 18 out of engagement with the workpiece 20. Although the saw 10 shown in FIG. 1 is a compound miter saw having a miter angle adjustment mechanism and a tilt adjustment mechanism, the invention is equally applicable to any other suitable cutting device such as a simple miter saw, a sliding compound miter saw, a chop saw, or the like.

During operation, when ready to make a cut, the operator grips the handle 36 and lowers the saw head assembly 18 down toward the workpiece 20 while depressing the power switch 38 and actuating the motor assembly 24. When the saw head assembly 18 is lowered to a sufficient position, the rotating saw blade 12 cuts the workpiece 20.

Figure 2:
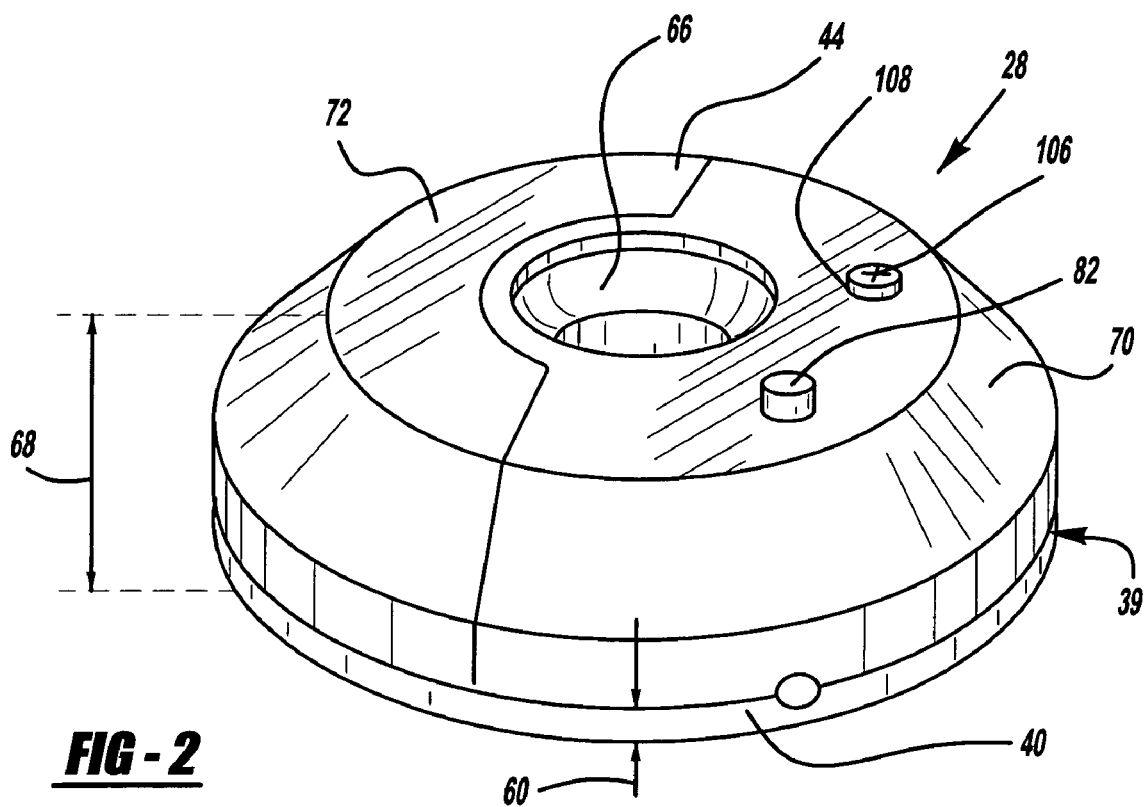
FIG. 2 is a top perspective of the laser module shown in FIG. 1.
Figure 3A:
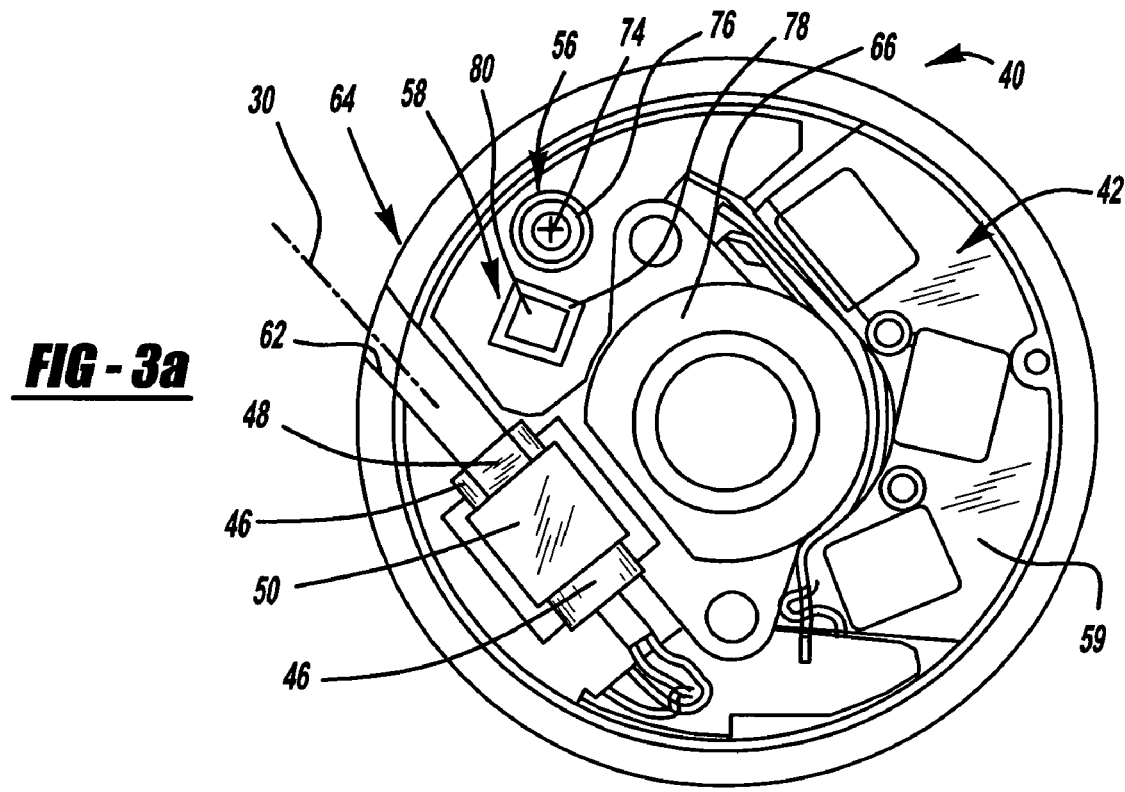
FIG. 3a is a top perspective view of an inner cover of the laser module shown in FIG. 2.
Figure 3B:
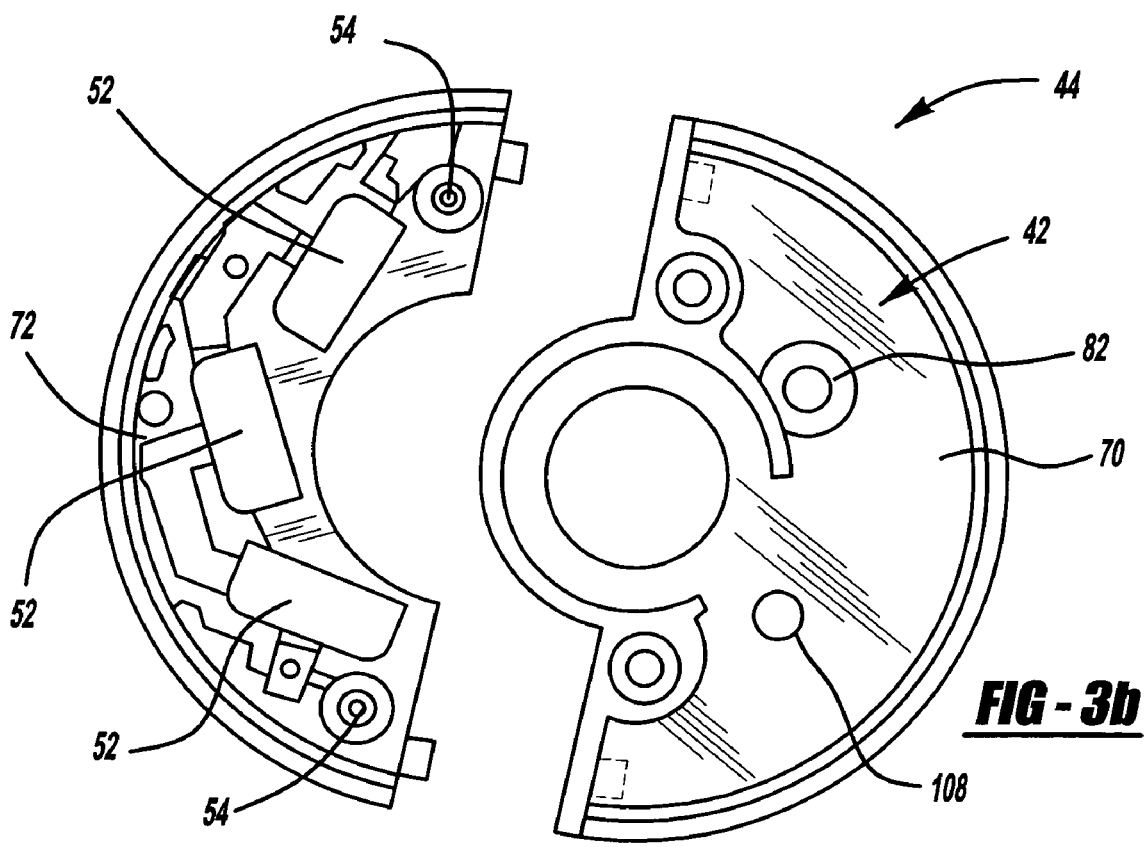
FIG. 3b is a bottom perspective view of an inner cover of the laser module shown in FIG. 2.

Referring now to FIGS. 2, 3a, and 3b, the laser module 28 includes a housing 39 having an inner cover 40 with a surface adjacent a face of the saw blade 12 and a two-piece outer cover 44 that cooperates with the inner cover 40 to define a cavity 42 for housing the components of the laser module 28. For example, referring to FIGS. 3a and 3b, the laser module 28 includes the following components: a laser generator 46 that emits light, a lens 48 for focusing the light into the indicator beam 30, a flexure bracket 50 for adjustably supporting the laser generator 46 within the cavity 42, a plurality of batteries 52 and electrical connectors 54 for supplying electricity to the laser generator 46, and a centrifugal switch 56 and an on/off switch 58 for selectively activating the laser generator 46.

The inner cover 40 may be made of any suitable material but is generally made of metal. The inner cover 40 includes a blade washer portion 59 that engages a face of the saw blade 12 and a central hub 66 extending from the blade washer portion 59. The blade washer portion 59 of the inner cover 40 has a relatively small thickness 60 to minimize the lateral distance between the indicator beam 30 and the face of the saw blade 12. Furthermore, the blade washer portion 59 of the inner cover 40 includes a laser beam channel 62 extending from the lens 48 to a perimeter 64 of the inner cover 40 to further reduce the lateral distance between the indicator beam 30 and the face of the saw blade 12. This configuration permits the indicator beam 30 to be substantially parallel to the face of the saw blade 12 when intersecting the workpiece 20. The central hub 66 extends substantially completely across the thickness 68 of the laser module 28 to strengthen the laser module 28. More specifically, when the laser module 28 is mounted to the saw blade 12 the central hub 66 completely bears the compression forces acting on the laser module 28 and prevents the plastic outer cover 44 and the components 46-58 within the cavity 42 from experiencing such forces. More specifically, a mounting bolt or a shoulder portion of the shaft 26 abuts a top collar of the central hub 66 to secure the laser module 28 to the saw blade 12.

As shown in FIG. 3b, the outer cover 44 is a two-piece cover having a laser cover 70 positioned over the laser generator 46 and a battery cover 72 positioned over the batteries 52. The laser cover 70 and the battery cover 72 are each independently connected to the inner cover 40 so that the battery cover 72 is removable from the inner cover 40 without requiring the removal of the laser cover 70 and without dismounting of the laser module 28 from the saw blade 12. This configuration simplifies access to the batteries 52 and reduces the time and effort required to replace the batteries 52.

As mentioned above, the laser generator 46 and the lens 48 cooperate to generate a dot-like laser beam that is emitted from the laser module 28 as the indicator beam 30. As a result of the rotation of the laser module 28, the indicator beam 30 appears as an indicator line (not shown) extending across a top surface of the workpiece 20 in a direction that is parallel to the saw blade 12. The laser generator 46 is connected to the inner cover 40 by the flexure bracket 50. The flexure bracket 50 is flexible to permit adjustment of the alignment of the indicator beam 30, as will be discussed in further detail below. Although a laser generator is disclosed in the figures, any suitable light source may be used to generate the indicator line on the workpiece, such as a light emitting diode (LED) or a focused electric light bulb.

The batteries 52 are relatively small, such as the type of batteries that would be suitable for a wrist watch, and are spaced from each other such that the weight of the laser module 28 is substantially balanced. The batteries 52 and the electrical connectors 54 define an electrical circuit that is selectively closed by the centrifugal switch 56 and/or the on/off switch 58. In an alternative design, another type of electrical power supply may be used, such as an electromagnetic generator that utilizes the rotational motion of the laser module 28 to generate power.

The centrifugal switch 56 and the on/off switch 58 are each wired in series with the batteries 52 and the laser generator 46 so that the laser generator 46 is only activated when one or both of the switches 56, 58 is in a closed position. The centrifugal switch 56 includes a small metal spring 74 positioned within a metal cylinder 76 in such a manner that the spring 74 does not engage the walls of the cylinder 74 when the spring 74 is in an undeflected position so that the centrifugal switch 56 is in an open position. Upon rotation of the laser module 28, however, centrifugal forces cause the spring 74 to deflect and engage the walls of the cylinder 74, thereby closing the centrifugal switch 56 and completing the electrical circuit between the batteries 52 and the laser generator 46. The centrifugal switch 56 reduces the likelihood of accidental activation of the laser generator 46, thereby increasing the battery life and potentially reducing the likelihood of laser-related injuries.

Because the position of the laser generator 46 can only be adjusted while the laser module is stationary, as will be discussed in more detail below, the on/off switch 58 is provided to selectively activate the laser generator 46 when the laser module 28 is stationary. The on/off switch 58 includes a housing 78 connected to the inner cover 40, an actuator 80 slidably positioned within the housing 78 so as to be movable between contracted and extended positions, a spring (not shown) to urge the actuator 80 towards the extended position, and a rubber cap 82 positioned on the top of the actuator 80 and extending through an opening in the outer cover 44 so as to be accessible to the saw operator. The bottom of the actuator 80 includes a metal connector so that the on/off switch 58 is open when the actuator 80 is in the extended position and is closed when the actuator 80 is in the contracted position. The on/off switch 58 is connected in parallel with the centrifugal switch 56 so that the closure of either switch 56, 58 completes the electrical circuit between the batteries 52 and the laser generator 46.

As mentioned above, the laser generator 46 is connected to the inner cover 40 by the flexure bracket 50, which is flexible so that the alignment of the laser generator 46 is adjustable with respect to the housing 39. This configuration permits the saw operator to properly align the location of the indicator line on the workpiece 20 with respect to the saw blade 12 and the kerf.

Referring to FIGS. 4 and 5, the flexure bracket 50 in one embodiment includes a support portion 84 supporting the laser generator 46 and a connector portion 86 connected to the inner cover 40. The support portion 84 is movable with respect to the connector portion 86 so that the alignment of the laser generator 46 can be adjusted with respect to the housing 39. For example, the support portion 84 includes: a first arm 88 supporting one end portion 90 of the laser generator 46, a second arm 92 supporting the other end portion 94 of the laser generator 46, and a third arm 98 connecting the first and second arms 88, 92 with each other. The connector portion 86 includes a fourth arm 96 connected to the first arm 84 and to the inner cover 40. However, the second arm 92 only extends a portion of the distance between the third and fourth arms 98, 96 so that a gap 100 exists between the second and fourth arms 92, 96 and the support portion 84 and connector portion 86 are movable with respect to each other. The first and second arms 88, 92 are generally parallel with each other and the third and fourth arms 98, 96 are generally parallel with each other so that the flexure bracket 50 is a substantially closed, rectangular shape.

As mentioned above, the first arm 88 supports one end 90 of the laser generator 46 and the second arm 92 supports the other end 94 of the laser generator 46. This configuration maximizes the distance between the first and second arms 88, 92 and provides stability between the points of connection for the laser generator 46 so that the location of the indicator line on the workpiece 20 remains substantially constant unless the flexure bracket 50 is actively adjusted.

Each of the first and second arms 88, 92 include an opening 102, 104 for receiving a respective end portion 90, 94 of the laser module 46. The laser generator 46 may be press-fit within the respective openings 102, 104. An additional securing means, however, such as an epoxy material or a mechanical fastener, may be provided between the respective components 46, 50. Additionally, the fourth arm 96 includes an opening 99 for mounting the fourth arm 96 to the inner cover 40 with a mechanical fastener or with another type of securing means such as an epoxy material.

An adjustment screw 106 extends through the outer cover 44 and is in threaded engagement with an opening 108 defined by the outer cover 44. The adjustment screw 106 abuts the third arm 98 of the flexure bracket 50 to control the position thereof. Therefore, rotation of the adjustment screw 106 adjusts the depth of the adjustment screw 106 within the laser module 28 and the alignment of the laser generator 46 with respect to the housing 39. More specifically, as the adjustment screw 106 is advanced into the housing 39, the gap 100 between the second and fourth arms 92, 96 of the flexure bracket becomes smaller and the path of the indicator beam 30 becomes angled outwardly, in a direction away from the saw blade 12. Therefore, the location of the indicator line on the workpiece 20 can be adjusted with respect to the saw blade 12 by rotating the adjustment screw 106. The operator is therefore able to adjust the indicator line to lie on a desired point of the workpiece 20, such as along the kerf or between the respective kerf.

The flexure bracket 50 may be made of a sheet metal material that is designed to permit flexing upon movement of the adjustment screw 106 and to prevent flexing when the adjustment screw 106 is not moving. Additionally, the fourth arm 98 includes a stop portion 110 to limit the range of motion of the second arm and a step portion 112 to promote flexing at the base of the first arm 88 upon movement of the adjustment screw 106. Furthermore, the adjustment screw 106 includes a means for facilitating rotation, such as a head portion that mates with a screwdriver or an allen wrench.

While the invention has been described in conjunction with specific embodiments it is to be understood that many alternatives, modifications, and variations will be apparent to those skilled in the art in light of the foregoing detailed description. It is therefore intended that the foregoing description be regarded as illustrative rather than limiting, and that it be understood that it is the following claims, including all equivalents, that are intended to define the spirit and scope of this invention.

What is claimed:

1. A laser module for use with a cutting device having a rotating saw blade, the laser module comprising:
   a housing defining a cavity and mounted so that the housing and the saw blade rotate in unison;
   a laser generator positioned within the cavity and configured to emit a laser beam from the housing along a beam path direction;
   a flexure bracket having a connector portion connected to the housing and a support portion supporting the laser generator, the support portion of the flexure bracket including a first arm supporting a first portion of the laser generator and a second arm supporting a second portion of the laser generator; and
   an adjuster extending through a portion of the housing and engaging the flexure bracket, the adjuster selectively movable with respect to the housing to adjust the beam path direction between periods of operation of the cutting device.

2. The laser module of claim 1, the adjuster including a screw extending through an opening in the housing.

3. The laser module of claim 2, the screw being in threaded engagement with the housing so that rotation of the screw adjusts the beam path direction.

4. The laser module of claim 3, the screw engaging the support portion of the flexure bracket so that the rotation of the screw moves the laser generator with respect to the housing and adjusts the beam path direction.

5. The laser module of claim 1, the support portion of the flexure bracket including a third arm connecting the first and second arms, and the adjuster engaging the third arm of the flexure bracket to adjust the beam path direction.

6. A laser module for use with a cutting device having a rotating saw blade, the laser module comprising:
   a housing defining a cavity and mounted so that the housing and the saw blade rotate in unison;
   a laser generator positioned within the cavity and configured to emit a laser beam from the housing along a beam path direction;
   a flexure bracket connected to the housing, and having a first arm supporting a first portion of the laser generator and a second arm supporting a second portion of the laser generator; and
   an adjuster engaging the flexure bracket to adjust the beam path direction.

7. The laser module of claim 6, wherein the first portion of the laser generator is an end portion and the second portion of the laser generator is another end portion.

8. The laser module of claim 6, the first arm of the flexure bracket defining a first opening for receiving the first portion of the laser generator and the second arm of the flexure bracket defining a second opening for receiving the second portion of the laser generator.

9. The laser module of claim 8, the first portion of the laser generator supported in the first opening by a press-fit connection and the second portion of the laser generator supported in the second opening by a another press-fit connection.

10. The laser module of claim 6, wherein the adjuster is a screw extending through an opening in the housing.

11. The laser module of claim 10, wherein the screw is in threaded engagement with the housing so that rotation of the screw adjusts the beam path direction.

12. The laser module of claim 6, wherein the flexure bracket is a single, unitary component.

13. A laser module for use with a cutting device having a rotating saw blade, the laser module comprising:
    a housing defining a cavity and mounted so that the housing and the saw blade rotate in unison;
    a laser generator positioned within the cavity and configured to emit a laser beam from the housing along a beam path direction;
    a flexure bracket connected to the housing and having a first arm extending away from the housing and supporting a first end portion of the laser generator, a second arm supporting a second end portion of the laser generator, and a third arm extending between the first and second arms, wherein the second arm is spaced apart from the housing to define a gap therebetween; and
    an adjuster engaging the third arm of the flexure bracket to adjust the gap and the beam path direction.

14. The laser module of claim 13, the flexure bracket including a fourth arm connected to the housing, the fourth arm defining a stop portion generally aligned with the second arm so as to limit a range of movement of the second arm.

15. The laser module of claim 13, wherein the flexure bracket is a single, unitary component.

16. The laser module of claim 13, wherein the adjuster is a screw extending through an opening in the housing.

17. The laser module of claim 16, wherein the screw is in threaded engagement with the housing so that rotation of the screw adjusts the beam path direction.

* * * * *